United States Patent
Suzuki

(10) Patent No.: US 9,262,990 B2
(45) Date of Patent: Feb. 16, 2016

(54) PROJECTOR SPATIALLY MODULATING INCIDENT LIGHT TO DISPLAY IMAGES OF DIFFERENT COLORS

(75) Inventor: Naofumi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 151 days.

(21) Appl. No.: 14/113,494

(22) PCT Filed: Mar. 28, 2012

(86) PCT No.: PCT/JP2012/058141
§ 371 (c)(1),
(2), (4) Date: Oct. 23, 2013

(87) PCT Pub. No.: WO2012/147442
PCT Pub. Date: Nov. 1, 2012

(65) Prior Publication Data
US 2014/0043379 A1 Feb. 13, 2014

(30) Foreign Application Priority Data

Apr. 27, 2011 (JP) ................. 2011-099814

(51) Int. Cl.
*G03B 21/00* (2006.01)
*G09G 5/02* (2006.01)
(Continued)

(52) U.S. Cl.
CPC .............. *G09G 5/02* (2013.01); *G03B 21/2033* (2013.01); *G03B 33/12* (2013.01); *H04N 9/3105* (2013.01);
(Continued)

(58) Field of Classification Search
CPC .... G03B 21/14; G03B 21/28; G03B 21/2073; H04N 9/3197

USPC ........................ 353/20, 30, 31, 85, 94, 98, 99; 348/742–747, 751, 766; 349/5, 7–9
See application file for complete search history.

(56) References Cited

U.S. PATENT DOCUMENTS

2003/0011751 A1* 1/2003 Sakata et al. .................... 353/30
2003/0202159 A1* 10/2003 Cobb et al. ...................... 353/31
(Continued)

FOREIGN PATENT DOCUMENTS

JP 2005-189472 A 7/2005
JP 2005-321524 A 11/2005
(Continued)

OTHER PUBLICATIONS

International Search Report for PCT Application No. PCT/JP2012/058141, mailed on May 22, 2012.
(Continued)

*Primary Examiner* — Sultan Chowdhury

(57) ABSTRACT

Green and red light from first green and red light sources light a first element. Green and red light from second green and red light sources light a second element. Blue light from a blue light source light a third element. A control unit causes an image of a first video signal to be displayed on the first element during lighting of first red source, and causes an image of a second video signal to be displayed on the first element during lighting of the first green source. The unit causes an image of the first signal to be displayed on the second element during lighting of the second red source, and causes an image of the second signal to be displayed on the second element during lighting of the second green source. The unit causes an image of a third video signal to be displayed on the third element.

4 Claims, 2 Drawing Sheets

(51) Int. Cl.
  *H04N 9/31*  (2006.01)
  *G03B 33/12*  (2006.01)
  *G03B 21/28*  (2006.01)
  *G03B 21/20*  (2006.01)
  *H05B 33/08*  (2006.01)

(52) U.S. Cl.
  CPC ........... *H04N 9/3155* (2013.01); *H04N 9/3164* (2013.01); *H04N 9/3197* (2013.01); *G03B 21/2073* (2013.01); *G03B 21/28* (2013.01); *H05B 33/0845* (2013.01)

(56) References Cited

U.S. PATENT DOCUMENTS

| | | | |
|---|---|---|---|
| 2006/0232750 A1* | 10/2006 | Yokote | H04N 9/3167 353/20 |
| 2007/0139319 A1* | 6/2007 | Nishida et al. | 345/83 |
| 2008/0055493 A1* | 3/2008 | Hanano | G02B 27/1033 349/9 |
| 2008/0143967 A1* | 6/2008 | Bierhuizen et al. | 353/20 |

FOREIGN PATENT DOCUMENTS

| | | |
|---|---|---|
| JP | 2007-65412 A | 3/2007 |
| JP | 2007-65429 A | 3/2007 |
| JP | 2007-141756 A | 6/2007 |
| WO | 2011/037057 A | 3/2011 |

OTHER PUBLICATIONS

Japanese Office Action for JP Application No. 2013-511978 mailed on Oct. 27, 2015 with English Translation.

* cited by examiner

PROJECTOR SPATIALLY MODULATING INCIDENT LIGHT TO DISPLAY IMAGES OF DIFFERENT COLORS

This application is a National Stage Entry of PCT/JP2012/058141 filed Mar. 28, 2012, which claims priority from Japanese Patent Application 2011-099814 filed Apr. 27, 2011, the contents of all of which are incorporated herein by reference, in their entirety.

TECHNICAL FIELD

The present invention relates to a projector, and more particularly relates to a projector that is provided with a solid-state light source, which is epitomized by an LED (Light-Emitting Diode).

BACKGROUND ART

Among recent projectors, some projectors are provided with LEDs of three colors, red, green and blue. They use display elements such as liquid crystal panels to spatially modulate light from the LEDs for each color to generate image light of each color, and that then project a color image made up by this image light.

Typically, the output characteristics differ for each of the red LED, green LED, and blue LED, the maximum output value of the red LED and green LED being smaller than that of the blue LED.

When each of the red LED, green LED, and blue LED is driven at maximum output, the luminance of the projected image also reaches a maximum. However, the color mixture ratio of the light (red, green, and blue) from the LEDs for each color that are being driven at maximum output differs from the predetermined color mixture ratio for obtaining the ideal white balance, and the projected image therefore has unnatural colors and deteriorates picture quality. As a result, the ideal white balance is normally obtained by controlling the output of the blue LED while using the maximum output value of the red LED or green LED as a reference.

The optical output of the light source itself can be increased by arranging red or green LEDs in an array. A projector, however, is subject to the limitation known as etendue that is determined by the area of the light source and the angle of divergence, and if the value of the product of the area of the light source and the angle of divergence is not made equal to or less than the product of the area of the display element and the acceptance angle (solid angle) that is determined by the f-number of the projection lens, a portion of the light from the light source is not used as projection light. Accordingly, despite the arrangement of a large number of LEDs in array form, the brightness of the projector cannot be improved beyond the limitations of etendue.

In order to achieve higher luminance in the above-described projector, the output of the red LEDs and green LEDs must be increased without raising etendue, and to achieve this goal, increasing the luminance of these light sources is crucial.

The luminance of LEDs can be increased by increasing the drive current. However, an increase in the drive current is attended by the generation of heat in the LEDs themselves, and this heat detracts from the efficiency of light emission of the LEDs. As a result, when the drive current surpasses a particular value, the optical output is saturated, and the output does not increase despite increases in the drive current. This type of "thermal saturation" limits the increase in luminance of LEDs realized by increases in the drive current.

As described hereinabove, the achievement of higher luminance of a projector raises the two problems of etendue and the influence of heat.

Patent Document 1 discloses a light source device as a technology that can solve these two problems and achieve higher luminance.

The light source device described in Patent Document 1 is used in a projector and includes: a plurality of solid-state light-emitting devices that are arranged in a ring such that the light emitted from each solid-state light-emitting device converges at a single point, light guide means that reflects the emitted light from each of the solid-state light-emitting devices in the same direction and guides this reflected light along the same light path, and control means that causes each solid-state light-emitting device to sequentially and intermittently generate light.

The light guide means has a reflection surface and rotation means that causes the reflection surface to rotate such that emitted light from each solid-state light-emitting device is reflected in the same direction.

The control means causes each solid-state light-emitting device to sequentially generate light in synchronization with the rotational motion of the reflection surface realized by the rotation means.

By means of the above-described light source device, light that is emitted from each solid-state light-emitting device and reflected by the reflection surface is guided along the same light path, whereby etendue does not increase.

By causing each solid-state light-emitting device to sequentially and intermittently generate light, the reduction of the efficiency of light generation caused by the generated heat of each solid-state light source can be suppressed, whereby the output of the light source device can be increased. A brief explanation for these effects is next presented.

The maximum amount of input current (the amount of current at which thermal saturation is produced) under pulsed operation typically greater than that under continuous operation. This is because the repetition of operation and non-operation at a fixed interval in a pulse operation results in a lower time-averaged current value than the current during operation, and the effect of generated heat is correspondingly lower.

According to the light source device described in Patent Document 1, each solid-state light-emitting device is operated in pulsed mode, whereby the maximum amount of input current of each solid-state light-emitting device is greater than that in continuous mode. As a result, a greater current can be supplied to each solid-state light-emitting device than in a case in which one solid-state light-emitting device is lighted continuously, and the luminance of each solid-state light-emitting device can be increased.

Each solid-state light-emitting device is operated sequentially and intermittently, whereby the output light of the light source device can be considered continuous light, and this light output is greater than for a case in which one solid-state light-emitting device is operated continuously. Accordingly, this light source device increases the light output without increasing etendue and can realize higher luminance.

A projector that has greater luminance can be provided by applying the light source device described in Patent Document 1 to the light source of each of the colors red, green, and blue of a projector. In addition, although the red and green LEDs have less output than a blue LED as described hereinabove, balance can be established by adjusting the number of LEDs used in the light source device of each color.

In Patent Document 2, a display device is described in which two green solid-state light sources are provided to increase green light.

The display device described in Patent Document 2 includes: first to third illumination units, a first display panel into which light from the first illumination unit is irradiated, a second display panel into which light from the second illumination unit is irradiated, a third display panel into which light from the third illumination unit is irradiated, an optical element into which image light from the first to third display panels is entered from respectively differing surfaces and in which image light that was entered from each surface is superposed and exited, and projection lens that projects image light from the optical element onto a screen.

The first illumination unit is equipped with a red solid-state light source, a first green solid-state light source, and a dichroic prism that transmits red light from the red solid-state light source and reflects first green light from the first green solid-state light source. In this first illumination unit, the red light from the red solid-state light source and the first green light from the first green solid-state light source are incident to the first display panel by the same light path by way of the dichroic prism.

The second illumination unit is equipped with a second green solid-state light source. The second green light from the second green solid-state light source is irradiated to the second display panel.

The third illumination unit is equipped with a blue solid-state light source. The blue light from the blue solid-state light source is irradiated to the third display panel.

In the display device described in Patent Document 2, the red solid-state light source and the first green solid-state light source are lighted in time division, and an image based on the video signal for red light is displayed on the first display panel during the lighted period of the red solid-state light source, and an image based on the video signal for green light is displayed on the first display panel during the lighted period of the first green solid-state light source.

The second green solid-state light source and the blue solid-state light source are lighted constantly. An image based on the video signal for green light is displayed on the second display panel and an image based on the video signal for blue light is displayed on the third display panel.

According to the display device according to Patent Document 2, while the first green solid-state light source is lighted, first green light from this first green solid-state light source is added to the second green light from the second green solid-state light source, whereby the luminance of the green image is increased. The use of this method improves the luminance of the color for which the maximum light source output is small, whereby the overall brightness of the projector can be improved.

LITERATURE OF THE PRIOR ART

Patent Documents

Patent Document 1: Japanese Unexamined Patent Application Publication No. 2007-141756
Patent Document 2: Japanese Unexamined Patent Application Publication No. 2007-065412

SUMMARY

Although higher luminance can be achieved in the light source device described in Patent Document 1, the light path must be switched by the rotation means, and this factor leads to increased costs due to the necessity to detect the orientation of the reflection surface during rotation and synchronize the timing of the rotational action of the reflection surface and the timing of lighting of the LED as well as the need for a design that takes into consideration the durability of the drive unit of the rotation means. In addition, a concern also arises regarding the anti-shock property of this configuration. Still further, a configuration, in which a plurality of solid-state light-emitting devices are arranged in ring form and a mechanical construction, such as rotation means, carries out switching of the light path, takes up considerable space and complicates miniaturization.

In the display device described in Patent Document 2, assuming that the maximum output value of the green solid-state light source is lower than the maximum output value of the red solid-state light source or blue solid-state light source, the luminance of the green light is increased by lighting a red solid-state light source and a first green solid-state light source in time division and by lighting a second green solid-state light source and blue solid-state light source constantly.

Although the luminance of the green light is increased in the display device described in Patent Document 2, the output of the red solid-state light source is limited and the luminance of the red light thus reduced, and as a result, the output of the blue solid-state light source is limited taking as a reference the red light for which luminance has been reduced. In the current state, blue LEDs have the greatest margin in the light output while achieving color balance, and as a result, if the red and blue LEDs are exchanged in the configuration described in Patent Document 2, the output of green can be increased while maintaining the output of red. However, when the output of two colors is less than that of one color, for example, if the output of both red and green is less than that of blue as in the current state of LEDs, the output of one of the two colors will become a bottleneck and the effect of increasing the output of the display device will be diminished.

Still further, in this configuration, a state in which the three colors, red, green, and blue, are emitted and a state in which only the two colors red and green are emitted are repeatedly switched. If this switching is not carried out at a sufficiently short periods, i.e., at a high frequency, the picture quality will be impaired due to a phenomenon similar to "color breaking (rainbow noise)" in a single-panel DLP projector. Accordingly, high-speed switching at a minimum of 60 times per second and more preferably two times or four times this speed is required. However, in order to increase the switching frequency, the operating frequency of the circuit that drives the LEDs or the display device must be increased. Typically, the power consumption increases in proportion of the increase of the operating frequency of this type of circuit. As a result, the power consumption of the projector is increased.

It is therefore an exemplary object of the present invention to provide a projector that offers a combination of features that includes small size, high luminance, low cost and high picture quality and that allows reducing to a required minimum limitation imposed on the output of a solid-state light source without requiring mechanical switching of the light path by means such as rotation means.

In order to achieve the above-described object, a projector according to an exemplary aspect of the present invention, which includes first to third display elements that each spatially modulate incident light to display images of mutually different colors and that projects the images of each color that are displayed on these display elements, includes:

a first illumination unit that includes a first solid-state light source that emits light of a first color and a second solid-state light source that emits light of a second color that differs from the first color and that irradiates light of the first and second colors that is emitted from the first and second solid-state light sources upon the first display element by way of the same light path;

a second illumination unit that includes a third solid-state light source that emits light of the first color and a fourth solid-state light source that emits light of the second color and that irradiates light of the first and second colors that is emitted from the third and fourth solid-state light sources upon the second display element by way of the same light path;

a third illumination unit that includes a fifth solid-state light source that emits light of a third color that differs from the first and second colors and that irradiates light of the third color emitted from the fifth solid-state light source upon the third display element; and a control unit that takes as input first to third video signals that correspond to images of each of the colors; that lights the first to fourth solid-state light sources in time division; that causes an image based on the first video signal to be displayed on the first and second display elements when the first and third solid-state light sources are lighted; that causes an image based on the second video signal to be displayed on the first and second display elements when the second and fourth solid-state light sources are lighted; that lights the fifth solid-state light source constantly; and that causes an image based on the third video signal to be displayed on the third display element.

EXPLANATION OF REFERENCE NUMBERS 1B, 1G, 1R, 2G, 2R solid-state light source
3, 4, dichroic prism
5-7 display element
8 polarization dichroic prism
9 projection optics
10 control unit

BEST MODE FOR CARRYING OUT THE INVENTION

Exemplary embodiments of the present invention are next described with reference to the accompanying drawings.

Figure 1:
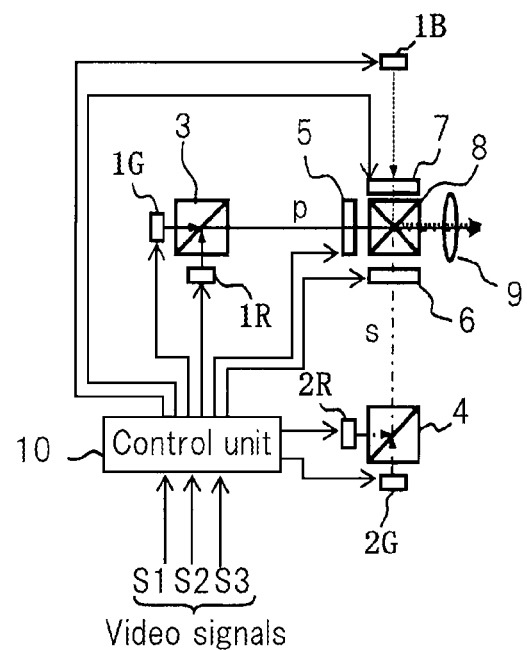
FIG. 1 is a block diagram showing the configuration of the projector that is an exemplary embodiment of the present invention.

FIG. 1 is a block diagram showing the configuration of the projector that is an exemplary embodiment of the present invention.

The projector shown in FIG. 1 includes: solid-state light sources 1B, 1G, 1R, 2G, and 2R; dichroic prisms 3 and 4; display elements 5-7; polarization cross dichroic prism 8; projection optics 9; and control unit 10.

Solid-state light source 1B is a solid-state light source having a peak wavelength in the blue wavelength band and is constituted by, for example, an LED or semiconductor laser for which the color of emitted light is blue. In the present exemplary embodiment, solid-state light source 1B emits blue P-polarized light or blue S-polarized light.

Solid-state light sources 1G and 2G are solid-state light sources having peak wavelength in the green wavelength band and are constituted by, for example, LEDs or semiconductor lasers for which the color of emitted light is green. Solid-state light sources 1G and 2G have the same peak wavelength. In the present exemplary embodiment, solid-state light source 1G emits green P-polarized light and solid-state light source 2G emits green S-polarized light.

Solid-state light sources 1R and 2R are solid-state light sources having a peak wavelength in the red wavelength band and are constituted by, for example, LEDs or semiconductor lasers for which the color of emitted light is red. Solid-state light sources 1R and 2R have the same peak wavelength. In the present exemplary embodiment, solid-state light source 1R emits red P-polarized light, and solid-state light source 2R emits red S-polarized light.

As a known problem that arises in the fabrication of LEDs, peak wavelength varies in the order of ±10-20 nm. Therefore, if the difference between the peak wavelengths is within a variation range of peak wavelength that occurs during manufacturing, the peak wavelengths are considered to be essentially identical. In the following explanation, the assumption that the peak wavelength (or the emission wavelength) is identical includes cases in which the peak wavelengths completely coincide and cases in which the peak wavelengths are substantially identical within the variation range of peak wavelength that occurs during manufacturing.

Dichroic prism 3 is composed of two right-angle prisms whose inclined surfaces are bonded together and a dichroic mirror composed of a dielectric multilayer film that is formed on the bonded surface of these right-angle prisms.

In dichroic prism 3, the dichroic mirror is provided at a position at which the optical axis of solid-state light source 1G intersects with (is orthogonal to) the optical axis of solid-state light source 1R, and more specifically, at the position at which the center beam of first green light from solid-state light source 1G intersects with (is orthogonal to) the center beam of first red light from solid-state light source 1R.

The first green light from solid-state light source 1G is entered into one surface of the dichroic mirror, the angle of incidence being approximately 45°. The first red light from solid-state light source 1R is entered into the other surface of the dichroic mirror, the angle of incidence being approximately 45°. The dichroic mirror transmits the first green light from solid-state light source 1G without alteration and reflects the first red light from solid-state light source 1R.

The first green light that passes through the dichroic mirror and the first red light that is reflected by the dichroic mirror are exited from dichroic prism 3 by way of the same light path.

Dichroic prism 4 is also constituted by two right-angle prisms whose inclined surfaces are bonded together and a dichroic mirror composed of a dielectric multilayer film that is formed on the bonding surface of these right-angle prisms.

In dichroic prism 4, the dichroic mirror is provided at the position at which the optical axis of solid-state light source 2G intersects with (is orthogonal to) the optical axis of solid-state light source 2R, and more specifically, is provided at the position at which the center beam of the second green light from solid-state light source 2G intersects with (is orthogonal to) the center beam of the second red light from solid-state light source 2R.

The second green light from solid-state light source 2G is entered into one surface of the dichroic mirror, the angle of incidence being approximately 45°. The second red light from solid-state light source 2R is entered into the other surface of the dichroic mirror, the angle of incidence being approximately 45°. The dichroic mirror transmits the second green light from solid-state light source 2G without alteration but reflects the second red light from solid-state light source 2R.

The second green light that passes through the dichroic mirror and the second red light that is reflected by the dichroic mirror are exited from dichroic prism 4 by way of the same light path.

The light path of the exited light from dichroic prism 3 and the light path of the exited light from dichroic prism 4 intersect (are orthogonal), and the light path of blue light from solid-state light source 1B intersects with (is orthogonal to) the light path of the exited light from dichroic prism 3 at this point of intersection.

Display elements 5-7, which spatially modulate incident light in accordance with video signals from control unit 10 to generate image light, are constituted by, for example, liquid crystal panels or DMD (Digital Mirror Devices).

Display element 5 is arranged on the light path of light that is exited from dichroic prism 3. Display element 6 is arranged on the light path of light that is exited from dichroic prism 4. Display element 7 is arranged on the light path of the blue light from solid-state light source 1B.

Figure 2:
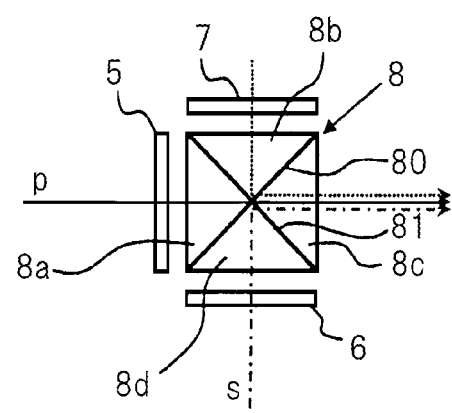
FIG. 2 is a schematic view showing the configuration of the polarization cross-dichroic prism of the projector shown in FIG. 1.

As shown in FIG. 2, polarization cross-dichroic prism 8 has four right-angle prisms 8a-8d in which the surfaces that form right angles are bonded together.

A uniform first plane is formed by the bonding surface of right-angle prisms 8a and 8b and the bonding surface of right-angle prisms 8c and 8d, and dichroic mirror 80 is formed on this first plane.

Dichroic mirror 80 has, as a spectral transmission (reflection) characteristic with respect to P-polarized light, a characteristic by which light of each of the colors red, green, and blue is transmitted. In addition, dichroic mirror 80 has, as a spectral transmission (reflection) characteristic with respect to S-polarized light, a characteristic by which red and green light is reflected and blue light is transmitted. The setting of the cutoff wavelength for P-polarized light and S-polarized light can be adjusted by means of the material, the number of layers, the film thickness, and the refractive index of the dielectric multilayer film.

A uniform second plane that intersects with (is orthogonal to) the first plane is formed by the bonding surface of right-angle prisms 8a and 8d and the bonding surface of right-angle prisms 8b and 8c, and dichroic mirror 81 is formed on this second plane.

Dichroic mirror 81 has, as a spectral transmission (reflection) characteristic, characteristics by which red and green light is transmitted and blue light is reflected regardless of the direction of polarization. The setting of the cutoff wavelength can be adjusted by means of the material, the number of layers, the film thickness, and the refractive index of the dielectric multilayer film.

When viewed from a direction perpendicular to a plane that is orthogonal to the first and second planes, the point of intersection of the first and second planes substantially coincides with the point of intersection of the light path of light that is synthesized by dichroic prism 3, the light path of light that is synthesized by dichroic prism 4, and the light path of solid-state light source 1B.

Polarization cross-dichroic prism 8 has first to third incident surfaces and an exit surface. The first incident surface is the surface that forms the inclined surface of right-angle prism 8a. The second incident surface is the surface that forms the inclined surface of right-angle prism 8d. The third incident surface is the surface that forms the inclined surface of right-angle prism 8b. The exit surface is the surface that forms the inclined surface of right-angle prism 8c, and is arranged so as to face the first incident surface.

Light (P-polarized light) that is exited from dichroic prism 3 is entered into the first incident surface by way of display element 5. Light (S-polarized light) that is exited from dichroic prism 4 is entered into the second incident surface by way of display element 6. The blue light (P-polarized light or S-polarized light) from solid-state light source 1B is entered into the third incident surface by way of display element 7.

In polarization cross dichroic prism 8, the red P-polarized light or green P-polarized light that is entered from the first incident surface passes through dichroic mirrors 80 and 81, and the passed light is exited from the exit surface.

The red S-polarized light or green S-polarized light that is entered from the second incident surface passes through dichroic mirror 81 but is reflected by dichroic mirror 80. The reflected light from dichroic mirror 80 is exited from the exit surface.

The blue S-polarized light or P-polarized light that is entered from the third incident surface passes through dichroic mirror 80 but is reflected by dichroic mirror 81. The reflected blue light from dichroic mirror 81 is exited from the exit surface.

Projection optics 9 is arranged in the direction of light that is exited from polarization cross-dichroic prism 8. Projection optics 9 projects the image light that is exited from the exit surface of polarization cross-dichroic prism 8 upon an external screen. The external screen may be a screen dedicated to this purpose or may be a structure such as a wall.

Control unit 10 takes as input video signal S1 for red image use, video signal S2 for green image use, and video signal S3 for blue image use, and based on these video signals S1-S3, controls the lighting operation of solid-state light sources 1B, 1G, 1R, 2G, and 2R and the display operation of each of display elements 5-7.

Figure 3:
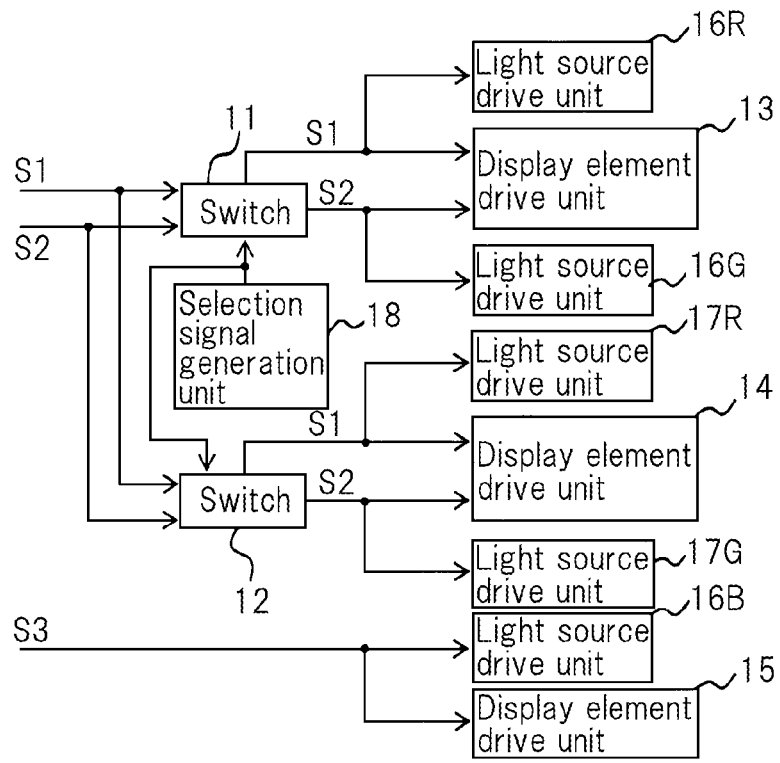
FIG. 3 is a block diagram showing the configuration of the control unit of the projector shown in FIG. 1.

FIG. 3 shows the configuration of control unit 10.

Referring to FIG. 3, control unit 10 includes switches 11 and 12, display element drive units 13-15, light source drive units 16B, 16G, 17G, 16R, and 17R, and selection signal generation unit 18.

Display element drive unit 13 drives display element 5. Display element drive unit 14 drives display element 6. Display element drive unit 15 drives display element 7.

Light source drive units 16B, 16G, 16R, 17G, and 17R drive solid-state light sources 1B, 1G, 1R, 2G, and 2R, respectively.

Video signals S1 and S2 are supplied to each of switches 11 and 12. Switches 11 and 12 select one of video signals S1 and S2 that have been received as input based on the selection signal from selection signal generation unit 18. For example, when the selection signal is high-level, switch 11 selects video signal S1 and switch 12 selects video signal S2. When the selection signal is low level, switch 11 selects video signal S2 and switch 12 selects video signal S1.

Selection signal generation unit 18 takes as input a synchronizing signal for synchronizing video signals S1-S3, and based on this synchronizing signal, generates a selection signal that switches between a high-level state and a low-level state at a predetermined period. The predetermined period may be, for example, a period that corresponds to the interval of one frame, or may be a period that corresponds to the interval of a plurality of frames.

For example, when video signals are displayed at 60 frames per second, the high-level state and low-level state of the selection signal may be set to switch every two frames or three frames. The amount of power that is consumed in switches 11 and 12 can be reduced by lowering the frequency of switching.

When video signal S1 is selected at switch 11, the selected video signal S1 is supplied to light source drive unit 16R and display element drive unit 13. In this case, display element drive unit 13 drives display element 5 based on video signal S1, and light source drive unit 16R drives solid-state light source 1R based on video signal S1.

When video signal S2 is selected at switch 11, the selected video signal S2 is supplied to light source drive unit 16G and display element drive unit 13. In this case, display element drive unit 13 drives display element 5 based on video signal S2, and light source drive unit 16G drives solid-state light source 1G based on video signal S2.

When video signal S1 is selected at switch 12, the selected video signal S1 is supplied to light source drive unit 17R and display element drive unit 14. In this case, display element drive unit 14 drives display element 6 based on video signal S1, and light source drive unit 17R drives solid-state light source 2R based on video signal S1.

When video signal S2 is selected at switch 12, the selected video signal S2 is supplied to light source drive unit 17G and display element drive unit 14. In this case, display element drive unit 14 drives display element 6 based on video signal S2, and light source drive unit 17G drives solid-state light source 2G based on video signal S2.

Video signal S3 is supplied to light source drive unit 16B and display element drive unit 15. Display element drive unit 15 drives display element 7 based on video signal S3, and light source drive unit 16B drives solid-state light source 1B based on video signal S3.

Figure 4:
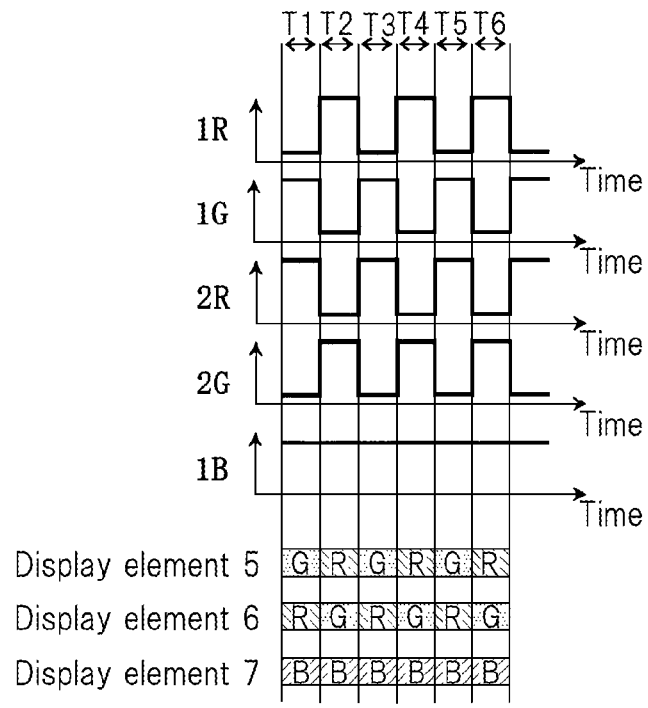
FIG. 4 is a timing chart for describing lighting control of the solid-state light sources and the display control of the display elements of the projector shown in FIG. 1.

FIG. 4 is a timing chart for describing the lighting control of the solid-state light sources and the display control of the display elements.

As shown in FIG. 4, in interval T1, solid-state light sources 1G, 1B, and 2R are lighted, and solid-state light sources 1R and 2G are not in a lighted state. Display element 5 modulates the green light from solid-state light source 1G based on video signal S2 to display a green image. Display element 6 modulates the red light from solid-state light source 2R based on video signal S1 to display a red image. Display element 7 modulates the blue light from solid-state light source 1B based on video signal S3 to display a blue image.

In interval T2, solid-state light sources 1B, 1R, and 2G are lighted, and solid-state light sources 1G and 2R are not in a lighted state. Display element 5 modulates the red light from solid-state light source 1R based on video signal S1 to display a red image. Display element 6 modulates the green light from solid-state light source 2G based on video signal S2 to display a green image. Display element 7 modulates the blue light from solid-state light source 1B based on video signal S3 to display a blue image.

After interval T2, the same lighting operation and display operation as in interval T1 is carried out in odd-numbered intervals, and the same lighting operation and display operation as in interval T2 is carried out in even-numbered intervals.

By means of the above-described lighting operations and display operations, two green solid-state light sources 1G and 2G are lighted in time division, a green image being displayed on display element 5 during lighting of solid-state light source 1G, and a green image being displayed on display element 6 during lighting of solid-state light source 2G. In this case, solid-state light sources 1G and 2G are each being lighted in a pulse operation.

When a solid-state light source is lighted in a pulse operation, the maximum amount of input current (the amount of current at which thermal saturation occurs) is greater than the maximum amount of input current when the solid-state light source is lighted continuously. As a result, the luminance of solid-state light source 1G can be made higher in odd-numbered intervals (T1, T3, T5 . . . ) than when a solid-state light source is lighted continuously, and the luminance of solid-state light source 2G can be made higher in even-numbered intervals (T2, T4, T6 . . . ) than when a solid-state light source is lighted continuously. Solid-state light sources 1G and 2G are lighted alternately, and the luminance of green light that is contained in the projected image can therefore be made greater than when one solid-state light source is lighted continuously.

In this way, by lighting solid-state light sources 1G and 2G in time division, the maximum amount of input current (the amount of current at which thermal saturation occurs) of each of solid-state light sources 1G and 2G can be increased, and the luminance of green light can be increased.

Similar to the above description, red solid-state light sources 1R and 2R are also lighted in time division, whereby the maximum amount of input current of each of solid-state light sources 1R and 2R can be increased compared to a case in which one red solid-state light source is continuously lighted, whereby the luminance of red light can be increased.

In addition, the green light from solid-state light source 1G and the red light from solid-state light source 1R are irradiated upon display element 5 by the same light path via dichroic prism 3, and the green light from solid-state light source 2G and the red light from solid-state light source 2R are irradiated upon display element 6 by the same light path via dichroic prism 4. Accordingly, the same level of etendue is produced as in a case of using one solid-state light source for each of the colors red and green.

The problem of etendue can thus be avoided, and moreover, the output of the green light source and the red light source can be increased.

In addition, because the maximum output of a red solid-state light source and green solid-state light source is less than the maximum output of a blue solid-state light source in an existing projector, the output of the blue solid-state light source was restricted with the solid-state light source having the lower output as the reference. According to the present exemplary embodiment, the luminance of the green light and red light can be increased, whereby the limitation on the output of the blue solid-state light source can be reduced. As a result, the luminance of the red light, green light, and blue light is increased, and the output of the projector is also increased.

The projector of the present exemplary embodiment further exhibits the following effects.

Solid-state light sources 1G and 2G are alternately lighted, and solid-state light sources 1R and 2R are alternately lighted, whereby the luminance of green light and the luminance of red light can both be increased. Accordingly, even when two of three colors have smaller output than the remaining color, the luminance of the two colors can be increased and the overall brightness of the projector can be improved.

Because the three colors are constantly lighted in the present invention, no concern arises regarding color breaking as in the display device described in Patent Document 2.

Still further, because there is no absolute necessity to carry out switching of the lighting of solid-state light sources at high frequency, power consumption of the control circuit can be reduced by reducing the frequency of switching.

Because mechanical light path switching such as rotation means is not required, problems such as an increase in the size or higher cost of the device do not arise, and the device further features superior resistance to shocks.

Due to the above-described effects, a projector can be provided that combines the advantages of small size, high luminance, low cost, and high picture quality.

The projector of the present exemplary embodiment described hereinabove is only one example of the present invention, and the configuration is open to various modifications that will be clear to one of ordinary skill in the art.

For example, light sources that supply non-polarized light may be used for solid-state light sources 1B, 1G, 1R, 2G, and 2R; a polarization conversion element may be provided for aligning the light from solid-state light sources 1G and 1R as P-polarized light; a polarization conversion element may be provided for aligning the light from solid-state light sources 2G and 2R as S-polarized light; and a polarization conversion element may be provided for aligning the light from solid-state light source 1B as P-polarized light or S-polarized light.

Alternatively, LCOS (Liquid Crystal on Silicon) may be used as display elements 5-7. LCOS has a construction in which liquid crystal is interposed between a silicon substrate on which a drive circuit and pixel electrode are formed and a transparent substrate that faces the silicon substrate, and light that passes through the transparent substrate and liquid crystal layer is reflected by the pixel electrode. Because LCOS is a reflective display element, the configuration of FIG. 2 is altered as appropriate according to this element.

Still further, dichroic prisms 3 and 4 may each be replaced by dichroic mirrors.

In the present exemplary embodiment, because the maximum output value of green and red solid-state light sources is less than the maximum output value of the blue solid-state light source, a configuration is adopted in which the luminance of the green and red solid-state light sources is increased, but the present invention is not limited to this form. The solid-state light sources that are driven in time division are set as appropriate according to the relation between the maximum output values of the solid-state light sources of each of the colors red, green, and blue. More specifically, regarding the light sources of the three colors, the solid-state light source of the color for which the maximum output value is highest is constantly lighted, and for the light sources of the remaining two colors, two solid-state light sources are prepared and driven in time division. In this case, the signal that is to be displayed is selected from among the video signals of each of the colors red, green, and blue and displayed according to the lighting operation of the solid-state light sources that are driven in time division.

Another Exemplary Embodiment

A projector according to another exemplary embodiment of the present invention is a projector that is equipped with first to third display elements that each spatially modulate incident light to display images of mutually differing colors and that projects images of each color that are displayed on these display elements; the projector of this embodiment including:

a first illumination unit that includes a first solid-state light source that emits light of a first color and a second solid-state light source that emits light of a second color that differs from the first color and that irradiates light of the first and second colors emitted from the first and second solid-state light sources upon the first display element by way of the same light path;

a second illumination unit that includes a third solid-state light source that emits light of the first color and a fourth solid-state light source that emits light of the second color and that irradiates light of the first and second colors emitted from the third and fourth solid-state light sources upon the second display element by way of the same light path;

a third illumination unit that includes a fifth solid-state light source that emits light of a third color that differs from the first and second colors and that irradiates light of the third color emitted from the fifth solid-state light source upon the third display element; and a control unit that takes as input first to third video signals that correspond to images of each of the colors, that lights the first to fourth solid-state light sources in time division, that displays an image based on the first video signal on the first and second display elements when the first and third solid-state light source are lighted, that displays an image based on the second video signal on the first and second display elements when the second and fourth solid-state light sources are lighted, that constantly lights the fifth solid-state light source, and that displays an image based on the third video signal on the third display element.

In the projector of this embodiment, the first to third display elements and the control unit correspond to, for example, display elements 5-7 and control unit 10 shown in FIG. 10.

The first illumination unit includes, for example, solid-state light sources 1G, 1R and dichroic prism 3 shown in FIG. 1. The second illumination unit includes, for example, solid-state light sources 2G and 2R and dichroic prism 4 shown in FIG. 1. The third illumination unit contains, for example, solid-state light source 1B shown in FIG. 1.

According to the projector of this embodiment, first and third solid-state light sources that emit light of the first color are alternately lighted, and second and fourth solid-state light sources that emits light of the second color are alternately lighted. In addition, the first solid-state light source and the fourth solid-state light source are simultaneously lighted, and the second solid-state light source and third solid-state light source are also simultaneously lighted. In this way, LEDs of the first and second colors can all be pulse-driven, whereby the luminance of light of both colors can be increased. Accordingly, even when two colors of the three colors have lower output than the remaining color, the luminance of the two colors can be increased and the overall brightness of the projector can be improved. In addition, the three colors are constantly lighted in the present invention, whereby the concern for color breaking as in the display device described in Patent Document 2 does not arise. Still further, switching of the lighting of the solid-state light sources does not need to be carried out at high frequency.

Because there is no need for mechanical switching of the light path such as by rotation means, such problems as increased size or higher cost of the device do not arise. In addition, the device has superior resistance to shocks.

Due to the above-described effects, a projector can be provided that features a combination of advantages including small size, high luminance, low cost, and high picture quality.

Although the present invention has been described with reference to an exemplary embodiment, the present invention is not limited to the above-described exemplary embodiment. The configuration and operation of the present invention is open to various modifications within a scope that does not depart from the gist of the present invention that will be clear to one of ordinary skill in the art.

This application claims the benefits of priority based on Japanese Patent Application No. 2011-099814 for which application was submitted on Apr. 27, 2011 and incorporates by citation all of the disclosures of that application.

What is claimed is:

1. A projector that includes first to third display elements that each spatially modulate incident light to display images of mutually different colors and that projects images of each color that are displayed on these display elements, said projector comprising:

a first illumination unit that includes a first solid-state light source that emits light of a first color and a second solid-state light source that emits light of a second color that differs from said first color and that irradiates light of said first and second colors, that is emitted from the first and second solid-state light sources, on said first display element by way of a same light path;

a second illumination unit that includes a third solid-state light source that emits light of said first color and a fourth solid-state light source that emits light of said second color and that irradiates light of said first and second colors, that is emitted from the third and fourth solid-state light sources, on said second display element by way of a same light path;

a third illumination unit that includes a fifth solid-state light source that emits light of a third color that differs from said first and second colors and that irradiates light of said third color, that is emitted from the fifth solid-state light source, on said third display element;

a control unit that takes as input first to third video signals that correspond to images of each of said colors; that lights said first to fourth solid-state light sources in time division; that causes and image based on said first video signal to be displayed on said first and second display elements when said first and third solid-state light sources are lighted; that causes an image based on said second video signal to be displayed on said first and second display elements when said second and fourth solid-state light sources are lighted; that constantly lights said fifth solid-state light source; and that causes and image based on said third video signal to be displayed on said third display element; and a color-combining unit that combines light from said first to third elements, wherein:

said color-combining unit includes a polarization cross-dichroic prism that includes a plurality of polarization dichroic mirrors in which transmittance differs depending on wavelength and polarization direction;

light irradiated from said first illumination unit is first polarized light that is polarized in a particular direction, and light irradiated from said second illumination unit is second polarized light that is polarized in a direction that differs from that of the first polarized light; and said polarization dichroic prism includes a first polarization dichroic mirror and a second polarization dichroic mirror, the first polarization dichroic mirror being provided with characteristics such that, regarding light of said first and second colors, said first polarized light is transmitted and said second polarized light is reflected, and moreover, regarding light of said third color, at least one of said first and second polarized light is transmitted; and the second polarization dichroic mirror being provided with characteristics such that, regarding light of said first and second colors, both said first polarized light and said second polarized light are transmitted, and moreover, light of said third color that is transmitted by the first polarization dichroic mirror is reflected.

2. The projector as set forth in claim 1, wherein said first polarized light is P-polarized light and said second polarized light is S-polarized light.

3. The projector as set forth in claim 1, wherein said first solid-state light source and said fourth solid-state light source are simultaneously lighted, and said second solid-state light source and said third solid-state light source are also simultaneously lighted.

4. The projector as set forth in claim 1, wherein said first color is red, said second color is green, and said third color is blue.

* * * * *